United States Patent
Henness

(10) Patent No.: US 12,406,407 B2
(45) Date of Patent: Sep. 2, 2025

(54) SYSTEM AND METHOD FOR AUTOMATICALLY ADJUSTING OBJECT TEXTURE IN DYNAMIC BACKGROUND ENVIRONMENTS

(71) Applicant: Marc Henness, Kissimmee, FL (US)

(72) Inventor: Marc Henness, Kissimmee, FL (US)

(73) Assignee: Paralude Inc., Orlando, FL (US)

( * ) Notice: Subject to any disclaimer, the term of this patent is extended or adjusted under 35 U.S.C. 154(b) by 290 days.

(21) Appl. No.: 18/373,199

(22) Filed: Sep. 26, 2023

(65) Prior Publication Data
US 2024/0070935 A1   Feb. 29, 2024

(51) Int. Cl.
| | | |
|---|---|---|
| *G06T 11/00* | (2006.01) | |
| *G06T 3/40* | (2024.01) | |
| *G06T 11/60* | (2006.01) | |
| *G09G 5/02* | (2006.01) | |
| *G09G 5/06* | (2006.01) | |
| *H04N 1/60* | (2006.01) | |
| *H04N 5/57* | (2006.01) | |

(52) U.S. Cl.
CPC .................. *G06T 11/001* (2013.01)

(58) Field of Classification Search
CPC .......... G06T 11/001; G06T 11/60; G06T 2207/10024; G06T 2207/20004; G06T 3/407; G09G 5/02; G09G 5/06; G09G 5/026; G09G 5/10; G09G 5/377; G09G 2320/02; G09G 2320/0271; G09G 2320/0276; G09G 2320/0285; G09G 2320/04; G09G 2320/06; G09G 2320/0626; G09G 2320/0666; G09G 2320/0673; G09G 2320/0693; G09G 2340/06; G09G 2340/10; G09G 2340/12; H04N 1/60; H04N 1/6019; H04N 1/6025; H04N 1/6027; H04N 1/6002; H04N 1/6005; H04N 1/6041; H04N 1/6075; H04N 1/6077; H04N 5/445; H04N 5/45; H04N 5/57; H04N 5/64; H04N 5/67–70; H04N 5/73–79

See application file for complete search history.

(56) References Cited

U.S. PATENT DOCUMENTS

| | | | | |
|---|---|---|---|---|
| 2014/0092120 | A1* | 4/2014 | Demos | G01J 3/2823 345/589 |
| 2015/0109323 | A1* | 4/2015 | Johnson | G06F 3/0488 345/594 |
| 2019/0325802 | A1* | 10/2019 | Aly | G09G 5/005 |
| 2021/0287348 | A1* | 9/2021 | Partin | H04N 1/6066 |

* cited by examiner

*Primary Examiner* — Wesner Sajous
(74) *Attorney, Agent, or Firm* — Jason T. Daniel, Esq.; Daniel Law Offices, P.A.

(57) ABSTRACT

A method of providing visibility of foreground elements on a display includes 1) providing a circular RGB hsl hue color wheel having a plurality of colors and numerical angular indicators, 2) constructing a matrix having a maximum color component and a minimum color component, 3) determining each pixel of a display and map the pixel to the matrix to determine a background hue, 4) determining two secondary hues that are different than the background hue, and 5) setting the foreground hue based on the two secondary hues.

6 Claims, 2 Drawing Sheets

SYSTEM AND METHOD FOR AUTOMATICALLY ADJUSTING OBJECT TEXTURE IN DYNAMIC BACKGROUND ENVIRONMENTS

TECHNICAL FIELD

The present invention relates generally to the field display properties, and more particularly to a system and method for automatically adjusting object texture in dynamic background environments.

BACKGROUND

The statements in this section merely provide background information related to the present disclosure and may not constitute prior art.

With advances in technology, more individuals are switching from static logos and symbols to dynamic elements that change shape, size, color and/or location when viewed on a computer. Additionally, it is not uncommon for the background on which these dynamic logos traverse to also be constantly changing.

Unfortunately, the combination of a dynamic logo with a dynamic background often results in the user's inability to clearly see the logo as its features blend with the background, thus diminishing the appearance of the same.

Accordingly, it would be beneficial to provide system and method for automatically adjusting object texture in dynamic background environments that can overcome these drawbacks.

SUMMARY OF THE INVENTION

The present invention is directed to a method of providing visibility of foreground elements on a display. One embodiment of the present invention can include providing a circular RGB hsl hue color wheel having a plurality of colors and numerical angular indicators, constructing a matrix having a maximum color component and a minimum color component, determining each pixel of a display and map the pixel to the matrix to determine a background hue, determining two secondary hues that are different than the background hue; and setting the foreground hue based on the two secondary hues.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Definitions

As described throughout this document, the terms "site owner," "system management" and/or "system administrator" are used interchangeably, and can include an individual, group or legal entity that is overseeing, providing and/or performing various aspects of the below described system and method steps.

In one preferred embodiment, various aspects of the methods and systems for automatically adjusting object texture in dynamic background environments can be performed on a website having any number of different website URL's and/or computer networks.

Figure 1:
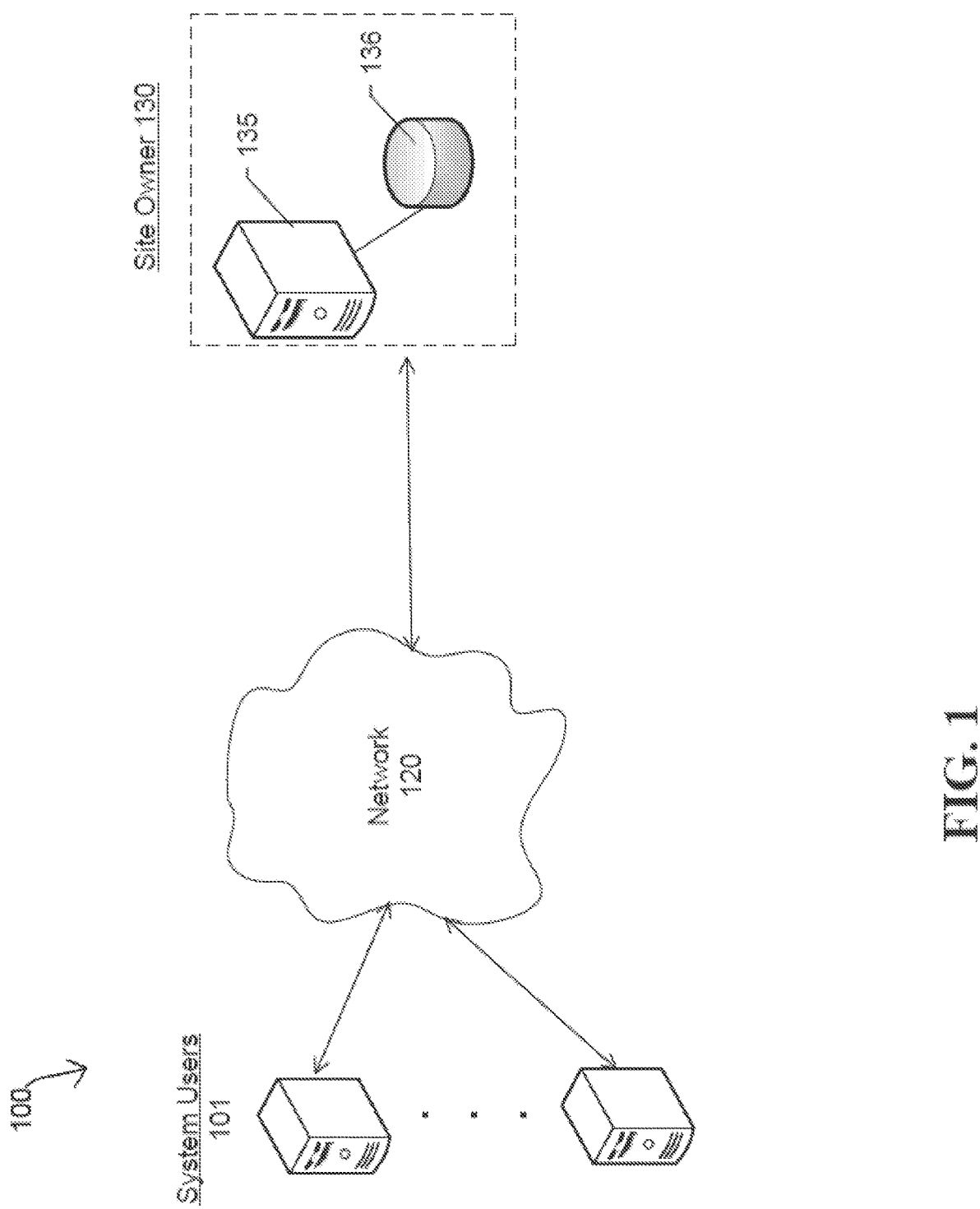
FIG. 1 is an exemplary operating environment for the system and method for automatically adjusting object texture in dynamic background environments that is useful for understanding the inventive concepts disclosed herein.

FIG. 1 is a schematic illustration of an exemplary system operating environment 100 for implementing a method for automatically adjusting object texture in dynamic background environments. The system 100 can include, for example, a plurality of user interface devices 101, representing users that are looking to utilize the system to create and/or improve their creative works such as images or logos, for example. Each of the user interface devices can be connected over a network 120 to a site owner server 130.

Each of the one or more interface devices 101 can be any form of computing device such as a computer, tablet, smart phone, or other such processor enabled device that can be operated by a human user. Moreover, each of the interface devices can also include one or more client applications, such as a web browser, for example, which can allow the device user to communicate with and view content from other devices and/or the server 130, over the network 120.

The site owner server 130, according to one embodiment, can include one or more individual computing devices 135 that can be connected to one or more databases 136 on which various portions of the method can be performed. The server 130 can function to provide a central hub for controlling the communication between the user interfaces through any number of different mediums such as the above noted website, for example. To this end, one or more of the individual computing devices 135 can comprise a web server, an email server, an application database server and so forth, or the system can employ a single server device which functions to handle each of these processes.

In this regard, portions of the described methodology can be implemented as a computer program product, i.e., a computer program tangibly embodied in a non-transient machine-readable storage device, for execution by, or to control the operation of, a data processing apparatus. The computer program can be written in any form of computer or programming language, including source code, compiled code, interpreted code, scripting code (e.g., JavaScript) and/or machine code, and the computer program can be deployed in any form, including as a stand-alone program or as a subroutine, element, or other unit suitable for use in a computing environment.

The database 136 can function to receive and store any type of system information. For example, the database can provide end user storage for various projects, images, logos, and search results obtained by the user while utilizing the website. As described herein, the database 136 can include any type of computer-readable storage mediums, including all forms of volatile and non-volatile memory such as, for example, semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. In addition, the devices can be operatively coupled to a communications network, such as network 120, to receive instructions and/or data from the network and/or to transfer instructions and/or data to the network.

The network 120 is a communication network that that facilitates any form or medium or digital or analog communication. Information transfer over the network 120 can be performed by a communication module based on one or more known communication protocols, such as Hypertext Transfer Protocol (HTTP), for example.

In operation, the system can provide users with an online platform from which they can perform internet searches. The platform can provide each user with a self-contained environment onto which the user can store various types of files and other such information. In various embodiments, the platform can provide options for communicating with other system users over the network.

This is a method of automating the selection of colors to use for foreground Elements such as Text, and Objects that will be presented over top of other primary content. It can be kind of thought of as a method of maintaining visibility of a heads-up display. The primary content could be images, text documents, video, or even life camera feeds such as would be the case in an augmented reality scenario.

The intent is to ensure visibility the foreground control elements, shown over top of the primary content while maintaining a similar level of brightness to the primary content.

In one embodiment, the Primary Usage can be to maintain the visibility of control elements over top of other content. For example, next, previous, or menu controls over top of displayed web pages, workspaces, or images. Several non-limiting examples include ensuring display icons for controls such as: 1. Bringing up a Notes Editor, 2. Bringing up content-based shopping suggestions, 3. Bringing up the code editor, and/or 4 moving to the next screen are available and visible regardless of the content on the display.

A second usage can be to maintain visibility of important text or notes over top of other content. For example, a notes editor can be brought up over top of the primary content without completely covering the primary content. In an augmented reality scenario, the primary content would be simply your view of the environment around you.

A third usage is to allow two visual states of the foreground Elements, by calculating two gray scale components used for setting the lightness of the Elements in either their normal, or highlighted states.

Figure 2:
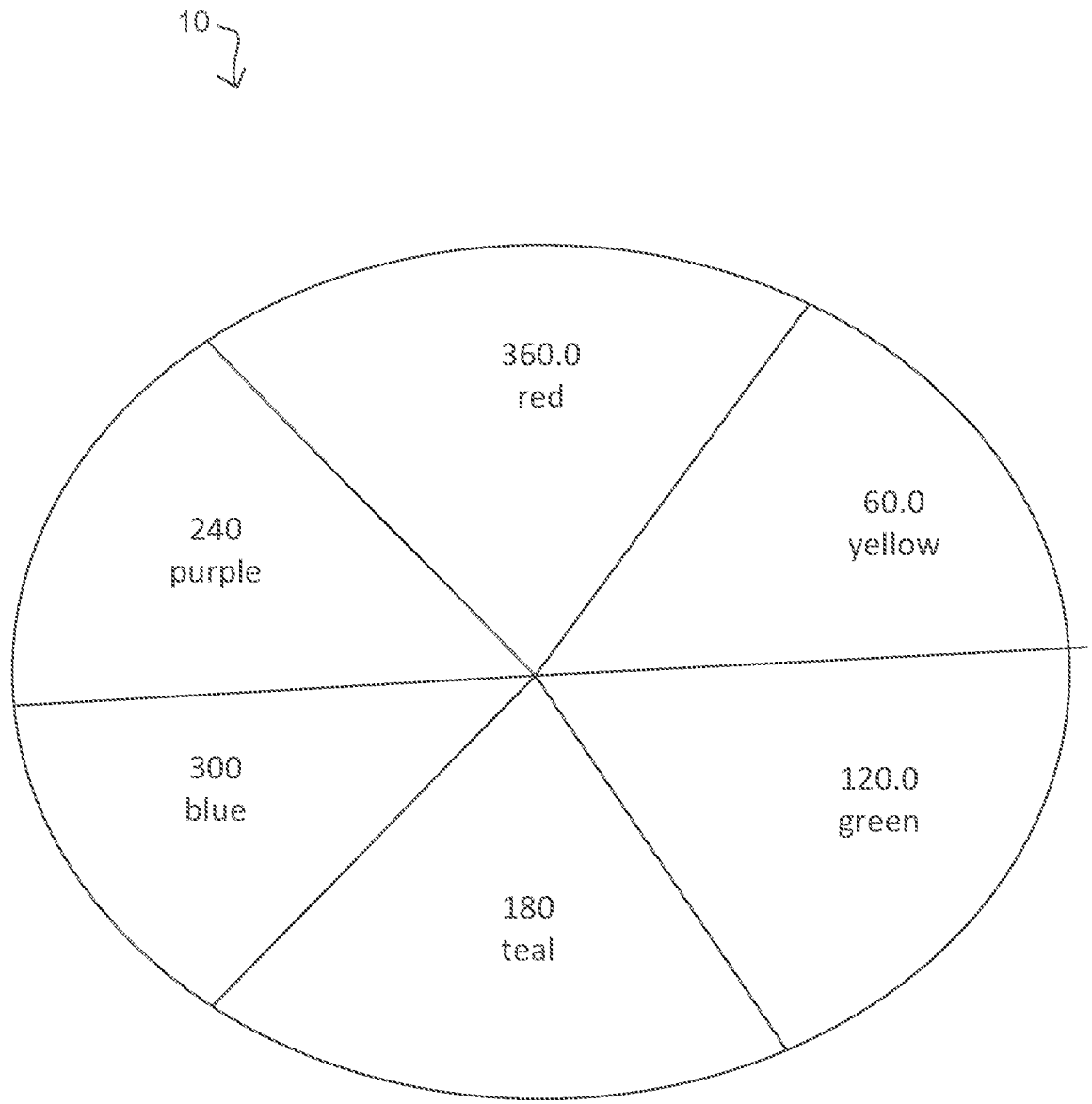
FIG. 2 is an exemplary illustration of an hsl color wheel chart that is useful for understanding the inventive concepts disclosed herein.

One exemplary method of calculating foreground hues is described below. The method does not calculate hsl actual hues, and instead is based on the idea that RGB color hues can be thought in a circular manner similar to hsl hues represented in the hsl color wheel of FIG. 2 and includes the following steps.

In one embodiment, the primary means of ensuring visibility of foreground elements is to find three hues for texturing the foreground elements that differ from the primary hues of the background texture. Determining the RGB values of a base three color foreground pallet.

First, construct a matrix with dimensions of maximum RGB component, and difference between the maximum and minimum components as follows:

hueMatrix[Maximum component(R,G, or B)][Max (R,G, or B)−Min(R,G, or B)]

Each element of the matrix will contain an average of the values for each of the RGB components, and a pixel count, which correspond to the Maximum component and (Maximum−Minimum) values.

hueMatrix[component(R,G,B)][Max(R,G, or B)−Min (R,G, or B)]=(average R, average B, average C, pixel Count)

To populate the hueMatrix loop through each pixel in the background image, finding the maximum, and minimum R, G, or B components, then apply it to the element in the matrix indexed by the maximum component (R, G, or B), and the difference between the maximum, and minimum component.

After applying all the pixels of the image to the matrix, get the primary background hue by finding the element of the matrix with the largest pixel count. The component index of the primary background hue also represents the primary background component (R, G, or B).

Then find two secondary hues by either (A) finding the element of the matrix with the largest pixel count indexed by each of the other two components, interrelating the values of any component's hues with zero pixels by taking the average of each component of the other two hues, or (B) by shifting the RGB components of the primary background hue to rotate the hue by 120 degrees twice, once for each secondary hue. If two of the component's hues have a zero-pixel count, method (B) should be used.

Finally calculate the foreground hues, by rotating each of the background hues 180 degrees. This is done by subtracting each component of each background hue from the maximum possible component value. Then subtract the value of the smallest inverted component in the hue from each of the components and divide it by the difference between the overall largest and smallest component values in all of the hues.

The final result is a pallet of three foreground hues all normalized to values between 0 and 1, which can then be scaled up by a grey scale value.

---

Example:
Using 2x2 image of [R,G,B] values and Max possible value of 255:
[255,0,0],[127,0,0]
[0,255,0],[255,0,128]
For each pixel:
matrix[ Max component ][ difference value ] = {
  (matrix[ Max component].R + R) / (matrix[ Max component] .pixels+ 1),
  (matrix[ Max component].G + G) / (matrix[ Max component].pixels + 1),
  (matrix[ Max component].B + B) / (matrix[ Max component].pixels + 1),
  matrix[Max component].pixels + 1
};

-continued

Such that the result of each pixel iteration is as follows:
Pixel 0: matrix[R][255] = {255,0,0,1}
Pixel 1: matrix[R][127] = (127,0,0,1)
Pixel 2: matrix[G][255] = {0,255,0,1}
Pixel 3: matrix[R][255] = {255,0,64,2}
Resulting in the following matrix:

|   | 127 | 255 |
|---|---|---|
| R | {127,0,0,1} | {255,0,64,2} |
| G | {0,0,0,0} | {255,0,0,1} |
| B | {0,0,0,0} | {0,0,0,0} |

The primary background hue would be {255,0,64,2} since it has the largest pixel value, making the primary background component (R).

To calculate the Primary Foreground hue the components of the element need to be Inverted by subtracting them from the maximum possible value of 255: {255-255, 255-0, 255-64}={0,255,191} then dividing each component by the difference between the largest, and smallest inverted values (255-0) as follows: {(0-0)/(255-0), (255-0)/(255-0), (191-0)/(255-0)}={0, 1, 0.75}

Other two hues:
Method (A):
Hue for Component (G): {((255-255)-0)/(255-0), ((255-0)-0)/(255-0), ((255-0)-0)/(255-0)}={0,1,1}
Hue for Component (B) calculated by interpolation: {(0+0)/2, (1+1)/2, (1+0.75)/2}={0,1,0.875}
Method (B): {0.75, 0, 1}, {1, 0.75, 0}

2. Calculate a grey scale value for the background pallet.
This is just the average of all RGB components values of all the pixels.
Example: Using the same 2×2 image as in example 1

Sum(sum(RGB)/3)/(2*2)=((255+0+0)/3+(127+0+0)/
3+(0+255+0)/3+(255+0+128)/3)/4=(85+42.5+
85+148.67)/4=90.29

Set Base and Highlight greyscale values for the foreground. The values should be significantly different from each other, and from the background. Calculate the Base, and Highlight greyscale values for the foreground based on the background grey scale value as follows:
Background>3*max/4:
Base=background−max/2
Highlight=max−background
Background<=3*max/4 and Background>max/2:
Base=max−background
Highlight=background−max/2
Background<=max/2 and Background>max/4
Base=max−background
Highlight=background+max/2
Background<=max/4
Base=background+max/2
Highlight=max−background
Example using the same 2×2 image as in example 1, and a maximum possible component value of 255:
Base=255−90.29=164.71
Highlight=90.29+127.5=217.79

4. Calculate the final grey scale adjusted base, by multiplying the components of the foreground hues by the grey scale values:
Example using the same 2×2 image as in example 1:
Base foreground pallet using foreground hues calculated by method (B):
{164.71*0, 164.71*1, 164.71*0.75},
{164.71*0.75, 164.71*0, 164.71*1},
{164.71*1, 164.71*0.75, 164.71*0}=
{0, 164.71, 123.53},
{123.53, 0, 164.71},
{164.71, 123.53, 0},
Highlight foreground pallet using foreground hues calculated by method (B):
{217.79*0, 217.79*1, 217.79*0.75},
{217.79*0.75, 217.79*0, 217.79*1},
{217.79*1, 217.79*0.75, 217.79*0}=
{0, 217.79, 163.34},
{163.34, 0, 217.79},
{217.79, 163.34, 0}

As to a further description of the manner and use of the present invention, the same should be apparent from the above description. Accordingly, no further discussion relating to the manner of usage and operation will be provided.

As described herein, one or more elements of the device 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individually identified elements may be formed together as one or more continuous elements, either through manufacturing processes, such as welding, casting, or molding, or through the use of a singular piece of material milled or machined with the aforementioned components forming identifiable sections thereof.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the term "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:
1. A method of providing visibility of foreground elements on a display, said method comprising:
providing a circular RGB hsl hue color wheel having a plurality of colors and numerical angular indicators;
constructing a matrix having a maximum color component and a minimum color component;

determine each pixel of a display and map the pixel to the matrix to determine a background hue;

determine two secondary hues that are different than the background hue; and set, via the display, a foreground hue based on the two secondary hues.

2. The method of claim 1, wherein said matrix includes: a hue matrix, a maximum component (R, G, or B), a max (R, G, or B) and a Min (R, G, or B).

3. The method of claim 2, wherein the matrix comprises a formulation of:

hueMatrix[Maximum component(R,G, or B)][Max (R,G, or B)−Min(R,G, or B)].

4. The method of claim 3, wherein said foreground hue is determined by rotating each of the background hues 180 degrees on the RGB hsl hue color wheel.

5. The method of claim 4, further comprising:

calculating a primary foreground hue;

setting a base and highlight grayscale value for a foreground; and calculating a final grey scale adjusted base.

6. The method of claim 5, wherein said calculating the final grey scale includes the steps of multiplying the calculated foreground hue by the grey scale value.

* * * * *